July 15, 1958     D. G. HANN     2,843,644
ELECTRODES FOR GLASS MELTING FURNACES
Filed Sept. 5, 1956
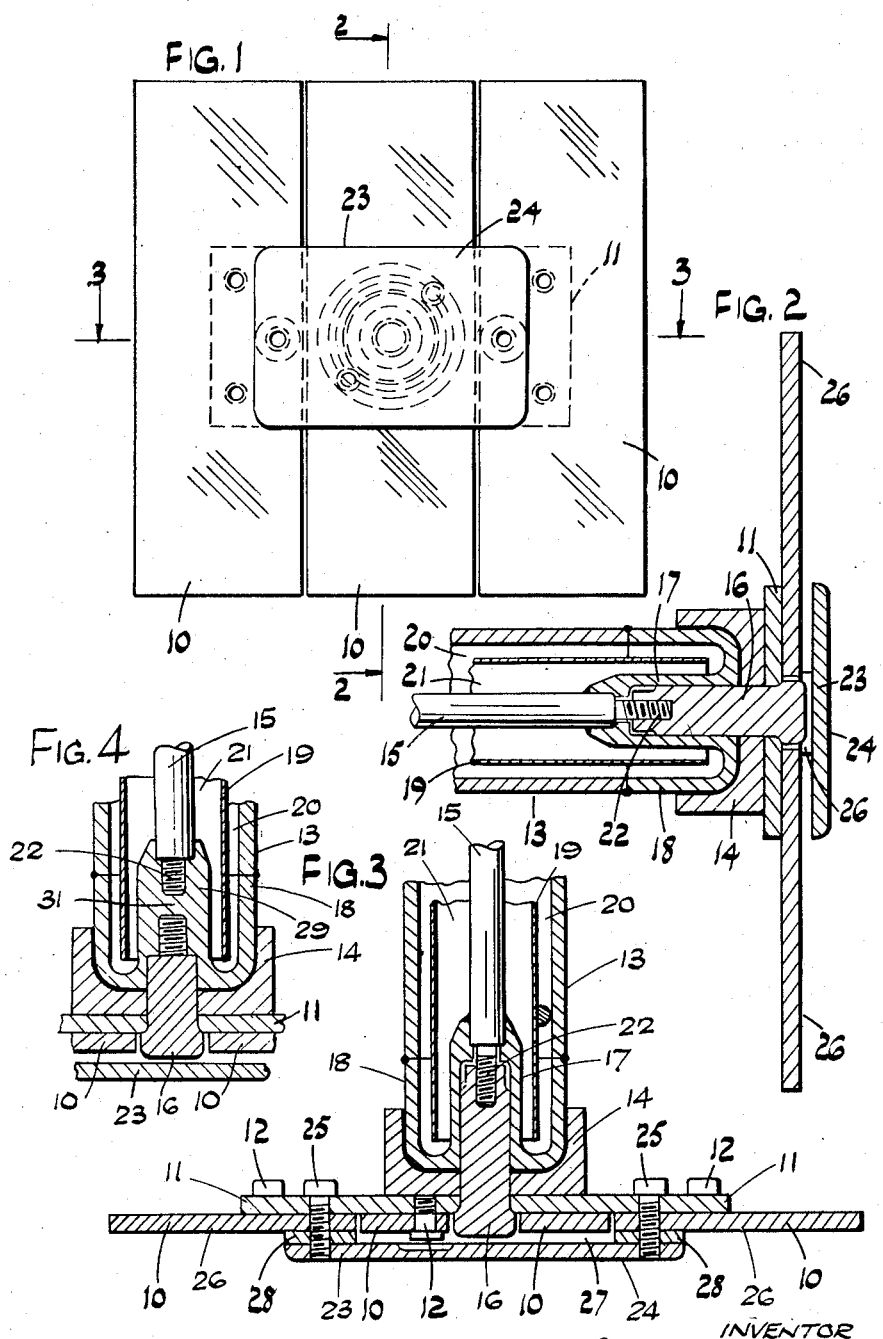
INVENTOR
Douglas Graeme Hann
BY
AGENT United States Patent Office 2,843,644
Patented July 15, 1958

2,843,644

ELECTRODES FOR GLASS MELTING FURNACES

Douglas Graeme Hann, Beckbury, near Shifnal, England, assignor to Elemelt Limited, Bilston, England, a British company Application September 5, 1956, Serial No. 608,092

Claims priority, application Great Britain September 9, 1955

15 Claims. (Cl. 13—6)

This invention relates to glass melting furnaces of the kind in which the glass is maintained in the molten state by the passage therethrough of an electric heating current communicated to the charge by immersed electrodes. The invention also relates to an electrode construction for use in such furnaces.

The term "glass" is to be deemed to include vitreous materials generally.

It is necessary to cool the electrode to avoid or reduce the risk of mechanical failure which is prone to occur in the region of greatest mechanical stress. In a plate-type electrode which is supported in an aperture in the furnace wall by means of a stem or like projecting support one region of stress concentration will occur in the stem itself and in the part of the electrode plate which lies immediately adjacent to the junction of the stem or support therewith.

Further, in this type of furnace the formation of bubbles or seeds is likely to occur in the molten glass charge in the neighbourhood of the electrodes, such bubbles or seeds being generated at or immediately adjacent to the electrode faces, probably as a result of electrolysis of the molten glass. I have found that the temperature attained by the electrode surface has a significant influence upon the extent to which bubble or seed formation is prevalent, such formation being more pronounced as the temperature rises and being reduced by cooling the electrode. Such bubbles or seeds are deleterious in certain types of glass, for example optical glass, and that used for making laboratory ware or heat-resisting oven ware.

Practical considerations generally require that for artificially cooling an electrode the cooling fluid should be introduced at one or more localities rather than uniformly at all points of its surface, and from the point of view of obviating or reducing the risk of mechanical failure this procedure is not disadvantageous since the fluid may be introduced at the locality at which such failure is most prone to occur. For instance, in a plate-type electrode the fluid is usually introduced at the stem or like projecting support. The consequence of this procedure however is that if the rate of heat extraction by the fluid is great enough to obviate or substantially reduce the risk of mechanical failure, then from the electrical point of view the zones of the electrode face from which current is intended to be communicated to the molten charge are over-cooled, i. e. cooled to an extent which so reduces the specific electrical conductivity of the neighbouring layer of glass as to produce a significant variation in local current density as between such zones of the electrode face situated more remotely from the highly-cooled part.

For instance, in a plate-type electrode supported at or near its centre and there subjected to relatively intensive cooling the current density in the glass layers at the peripheral margin of the plate will be appreciably higher than the current density at or near the centre.

Since the total current or mean current density for each electrode must be maintained at a certain value determined by the overall heat loss from the furnace and the temperature required in the whole body of the melt, it may and often does happen that bubble or seed formation, whilst kept at an acceptably low level at or near the over-cooled zones, is unacceptably high at the more remote zones of the electrode face due to the high temperature engendered by the relatively high current densities thereat.

One object of the invention is to overcome or reduce these disadvantageous effects.

With this object in view there is provided in a glass melting furnace of the kind specified means for controlling the extraction of heat from the current-communicating face of an electrode towards a relatively intensively cooled part of the electrode comprising a thermally resistive layer affording a thermal conductivity less than that of the material from which the main body of the electrode is formed and operatively interposed between such part and the zone of the current-communicating face which would otherwise be over-cooled.

The thermally resistive barrier may be set up by so forming or constructing the electrode that between the relatively intensively cooled part and the zone of the current communicating face which would otherwise be over-cooled is provided a gap, pocket or void, which either remains as such or, when in use, becomes filled with glass, or is pre-filled, partly or wholly, with some other substance of lower thermal conductivity than that of the material from which the main body of the electrode is formed.

Another of the problems encountered in constructing an electrode for glass melting furnaces of the kind specified is that the range of materials which can be utilised for the construction of the body of the electrode which is intended to be immersed in glass melt and from which current is communicated into the glass are few in number because it is necessary that they should satisfy the requirements of higher melting point than the particular glass concerned, and minimisation of gas bubble formation and discoloration of the glass. The most suitable of these materials, namely molybdenum, oxidizes rapidly in air at the temperature involved. This is also true of a somewhat less suitable but still possible alternative metal, namely tungsten.

The electrode has to be supported in the furnace chamber, the usual means for this purpose being in the form of a stem projecting through the furnace wall, and the inner part of the supporting member is almost inevitably subjected to contact with molten or nearly molten glass (but not to contact with air) whilst the outer part of the supporting member although not subject to quite such a higher temperature as the inner part, is subject to contact with the air. Materials such as molybdenum which are suitable for the inner part of the supporting member are not therefore suitable for the outer part so that in consequence electrode construction has developed in such a way as to make use of different materials for the body of the electrode and inner part of the supporting member on the one hand and for the outer part of the supporting member on the other hand.

In order to enable the outer part of the supporting member, which conveniently may be made of steel, to project inwardly to the furthest possible extent, without incurring mechanical failure due to excessive heating thereof, as well as to maintain the body of the electrode at the temperature best suited to the particular glass melting operations in question, it is usual to cool the support by circulating a cooling liquid, conveniently water, through the interior of the supporting member which for this purpose is made hollow.

Despite all these constructional precautions the life of electrodes so constructed, although of adequate duration to enable glass melting operations to be carried out without unacceptably frequent stoppages, is nevertheless shorter than is desirable Examinations which I have carried out of electrodes which have failed mechanically after a period of service show that in a high proportion of such failures the mechanical breakage occurs in the inner part of the supporting member, which has normally been made of molybdenum, at a position which is closely adjacent to its junction with the inner end of the outer part of the supporting member, which has normally been made of steel. Furthermore from such examination I have concluded that initiation of the "eating-away" or erosion of the molybdenum component has occurred from the interior surface of the hollow supporting member where the junction of the two metals has been exposed to cooling water.

Another possible cause of failure is the development of a high resistance joint between the supporting stem of the electrode and the electrode body. This particular part of the electrode involves some concentration of supporting stress and it is therefore desirable that it should also be called upon to perform an electrical duty which might in certain circumstances impair its ability to perform its mechanical function.

A further object of the present invention is to provide a new or improved construction of electrode which is intended so far as possible to avoid or reduce electrode failure from the causes mentioned above.

With this object in view according to the invention an electrode for a glass melting or refining furnace comprises an electrode body and a supporting stem projecting therefrom, the electrode body being made of molybdenum, tungsten or other refractory and electrically conductive material selected in relation to its ability to withstand immersion in the molten glass and the stem being made of steel or other material selected in relation to its ability to withstand exposure to the atmosphere at the operating temperature without destructive oxidation or corrosion, the inner end portion of the stem is protected from the destructive effect of immersion in the molten glass by a socket part of molybdenum, tungsten or one of said refractory materials, in which the inner end portion of the stem is received and the stem having an internal axially extending passageway for the flow of cooling liquid and for the accommodation of an axially extending conductor member for conveying current to the electrode body independently of the current (if any) conveyed by the stem, the stem having an end cap at its inner end which prevents contact between the liquid and the electrode body and socket part so that the existence of molybdenum-steel, or tungsten-steel, or other corrosion-prone load carrying junctions in the presence of the liquid are avoided, the passageway for the cooling liquid extending near enough to the inner end of the stem and the latter having sufficient thermal communication with the electrode body for the cooling liquid to be effective to cool the electrode body as well as the stem and prevent mechanical failure of these under operating conditions.

The invention is illustrated in the accompanying drawings wherein:

Figure 1 shows in front elevation one construction of electrode in accordance with the present invention.

Figure 2 is a view of the same construction in cross section on the line 2—2 of Figure 1.

Figure 3 is a view of the same construction in cross section on the line 3—3 of Figure 1, and Figure 4 is a fragmentary view similar to Figure 3 illustrating an alternative construction.

In the construction illustrated the body of the electrode is of plate form and comprises a plurality of plate elements 10 of molybdenum disposed in a common plane with their adjacent longitudinally extending edges parallel to each other. These plate elements are secured together and maintained in this relation by a transverse connecting plate 11 bridging the several plate elements 10 (of which typically there may be three) and secured thereto in face-to-face contact by bolts 12 screwing into tapped holes in either the plate element or connecting plate as may be appropriate. The transverse connecting plate 11 and these bolts 12 may be made of molybdenum.

The electrode body is supported from the wall of the furnace chamber adjacent to which it is disposed when in use by means of a stem 13 which projects perpendicularly to the plane of the plate element 10 or in such other angular relationship thereto as may be desired and from the side of these plate elements remote from the main current communicating faces 26 thereof.

The stem 13 is made of a material selected to withstand the destructive effects of exposure to the atmosphere at the operating temperature, and I have found that steel when suitably cooled may be used for this purpose.

The stem is secured to the electrode body by reception of its inner end portion in a socket part in the form of a bush or thimble 14 having a plane flat end in face-to-face contact with the connecting plate 11, the inner end portion of the stem fitting closely in this bush or thimble and preferably being united thereto by fusion. The bush or thimble 14 may be made of molybdenum and covers the external face of that end portion of the stem which would otherwise be subjected to the destructive effects of immersion in the molten glass, portions of the stem not so covered being maintained by cooling fluid flowing through the stem at a temperature low enough to avoid such destruction.

The electric current is conveyed to the electrode body through a stud 16 of molybdenum which is headed at its inner end and fits tightly in an opening in the connecting plate 11, this stud being of sufficient length to enter for some distance into the stem and preferably being disposed concentrically with the bush or thimble 14, the blind end of which is formed with a hole through which the stud passes as a close fit.

A conductor rod 15 passing axially through the passageway afforded by the interior of the hollow stem 13 is connected electrically with the stud by means of a screw threaded spigot 22 which screws into a tapped socket in the stud 16.

The stem also contains a tube 19 of metal dividing the stem internally into two annular passageways 20 and 21 communicating at their inner ends so that cooling liquid such as water may be passed down one of these passageways and up the other by means of a suitable pump (not shown).

If the molybdenum stud 16 were left exposed internally of the stem to the liquid there would be an exposed junction between the steel stem and the molybdenum stud in contact with the water, and there would be another junction between dissimilar metals where the conductor rod 15 screws into the stud 16, the conductor rod conveniently being made also of steel.

To avoid exposing such junctions to the cooling liquid such as water the stem is provided with an end cap 18 including a sleeve like part 17. This sleeve like part 17 together with the end wall of the end cap 18 and the portion of the cap which forms a continuation of the side walls of the stem 13 effectively lines the annular space existing between the stud 16 and the bush or thimble 14 and prevents any of these molybdenum parts being brought into contact with the water.

It will be understood that a liquid tight joint is formed where the conductor rod 15 passes through the end of the sleeve like part 17. This may be contrived by making the conductor rod 15 a tight fit in the aperture in the end of the sleeve like part 17 and as illustrated by uniting it by fusion, e. g. welding or brazing the conductor rod 15 to the end of the sleeve like part 17 where it enters this part.

The screw threads of the spigot 22 cooperating with companion screw threads in a tapped hole in the stud 16 provide good electrical contact between this stud 16 and the conductor rod 15, whilst the tight fit of the stud 16 in the opening of the connecting plate 11 ensures that current is transmitted to the connecting plate without encountering high electrical resistance and is in turn communicated from the connecting plate to each of the plate like elements 10.

Thus also some of the current may pass down the side walls of the stem 13 reliance is not placed upon the transmission of the whole of the current through the soldered joint between the end cap 18 and the bush or thimble 14, so that even if a high electrical resistance develops at this joint this will not lead to over-heating at this particular position.

Therefore the risk of mechanical failure at this position through excessive heat is avoided or materially reduced.

Likewise the avoidance of corrosion-prone junctions in contact with the cooling liquid such as water internally of the stem is also avoided so that mechanical failure arising from the "eating away" of molybdenum parts is again avoided or reduced.

A possible alternative arrangement for conveying electric current to the stud 16 from the rod 15 is illustrated in Figure 4 wherein parts corresponding to those of Figures 1 to 3 have been designated by like numerals of reference. In this alternative construction the rod 15 in the latter might be screwed into a blind socket in the end of a sleeve like part 29 would preferably be screw threaded internally for cooperation with an external screw thread on a stud 30, the extensive surface contact produced by the interengaging screw threads being sufficient to ensure a low resistance electrical path from the conductor rod 15 to the stud 30, the current being conveyed to the stud 30 through the intermediary of the end 31 of the sleeve like part 29.

It will be evident that since cooling liquid such as water circulates through the passageways 20 and 21 it is effective in relation to both the stem 13 and the part of the electrode body immediately adjacent thereto more particularly the connecting plate 11 and the parts of the plate elements 10 in metal-to-metal contact therewith.

Referring now to the electrode body comprising the plate elements 10 the central zone of this body which is of plate-like form is provided with an auxiliary plate 23 of molybdenum, the exposed or forwardly directed face 24 of which then forms part of the main current communicating face of the electrode in substitution for the face portion of the plate elements 10 which it overlies.

The auxiliary plate 23 is connected electrically to the plate elements 10 but is spaced away therefrom by means of bolts 25 and spacers 28 of molybdenum.

Thus glass can enter into the space 27 between the auxiliary plate 23 and the plate elements 10 and establish a thermally resistive barrier between the auxiliary plate 10 and the end of the stud 16 and the immediate surrounding portions of the plate elements 10. The space 27 may, if desired, be filled with a material other than glass having a thermal conductivity lower than that of the metal of which the plate elements, connecting plate and auxiliary plate are made so as to reduce the rate of heat extraction from the auxiliary plate in comparison with that which would obtain were the auxiliary plate in metallic contact with the stud 16 whereby the temperature of the current communicating face 24 is maintained at a value which is appreciably higher than the temperature of the face portions of the plate elements 10 over which the auxiliary plate lies.

A suitable filling material as an alternative to glass would be a refractory cement, fused silica, or asbestos (for very low temperatures).

The construction above described enables the stem 13 as well as the bush or thimble 14, the stud 16, the connecting plate 11, and portions of the plate elements nearest the stem to be maintained at a temperature which is low enough in the case of the stem to avoid or reduce oxidation along those parts of the stem which are exposed to the atmosphere, and which is low enough in respect of the other components referred to to avoid or substantially reduce the risk of mechanical failure, it being appreciated that the mechanical stresses involved in supporting the plate elements 10 from the stem although not great are greatest in the immediate neighbourhood of the stem.

The more remote parts of the plate elements 10 will tend to attain an appreciably higher temperature because they are further removed from the source of heat extraction, namely the cooling fluid flowing through the stem, and the result will be that glass layers adjacent to the main current communicating face 26 of the plate elements 10 outwardly of the auxiliary plate 23 will also tend to be maintained at a higher temperature and hence have a greater electrical conductivity than would glass layers situated near the centre of the plate elements 10 (considered collectively) were the auxiliary plate 23 not provided.

This would be extremely undesirable because it would lead to the establishment of a greater current density of glass at these outer regions in comparison with the current density in the glass adjacent to the central region, and this would still further accentuate the temperature differences in the glass at these regions.

Consequently bubble or seed formation might be prevalent at the outer or remote regions, whilst at the central region bubble or seed formation would be non-existent or substantially so but the glass in this central region might be cooled below the point at which it is appreciably electrically conductive.

The provision of the auxiliary plate 24 with the thermal barrier resulting from the existence of the space 27 overcomes or substantially reduces this undesirable effect because the thermal resistance to extraction of heat from the auxiliary plate allows the temperature of its current communicating face to be equal or nearly equal to the temperature of the current communicating faces 26 afforded by the plate elements 10 outwardly of the auxiliary plate 23.

Although the electrode body of plate-like form as shown in the illustrations is substantially square I have found that the cooling effect produced by the cooling fluid flowing through the stem tends to be promoted to a rather greater degree lengthwise of the connecting plate 11 than in a direction at right angles thereto, and for this reason I have found it advantageous to make the auxiliary plate 23 of rectangular or approximately rectangular form with its longer dimension disposed lengthwise of the connecting plate 11.

The spacing between the auxiliary plate 23 and the plate elements 10 is preferably of the same order as the thickness of the plate elements 10 and the auxiliary plate a preferred value where a quarter-inch thick plate is employed being up to 3/8 of an inch. A value of 1/8 of an inch is found to produce satisfactory results.

It is to be understood that the invention is not limited to electrodes whereof the plate elements, auxiliary plate and connecting plate are made of molybdenum. Other suitable materials might be employed according to the temperature at which glass melting or refining operations are required to be conducted and according to the composition of the glass. For example these parts might be made of tungsten.

What I claim then is:

1. In a glass melting furnace of the kind specified, means for controlling the extraction of heat from the current communicating face of an electrode towards a relatively intensively cooled part of the electrode comprising a thermally resistive layer affording a thermal conductivity less than that of the material from which the main body of the electrode is formed and operatively interposed between such part and the zone of the current-communicating face which would otherwise be over-cooled.

2. In a glass melting furnace of the kind specified, an electrode having a body presenting current communicating face and having a support spaced from said face, means for cooling said support, and means resistive to the conductive transmission of heat operatively interposed between said support and that part of said face which would otherwise be over-cooled by extraction of heat from said body to said support.

3. In a glass melting furnace of the kind specified, an electrode having a body including a main body member and a support therefor at one side of said main body member, means for cooling said support at a position adjacent to its junction with said main body member, said body further including an auxiliary plate connected electrically with said body member and mounted in spaced apart relation with said body member on the side thereof remote from said support, said auxiliary plate presenting a current communicating face portion directed away from said main body member.

4. In a glass melting furnace of the kind specified having a body including a main body member and a support therefor at one side of said main body member, means for cooling said support at a position adjacent to its junction with said main body member, said body further including an auxiliary plate connected electrically with said body member and mounted in spaced apart relation with said body member on the side thereof remote from said support, said auxiliary plate presenting a current communicating face portion directed away from said main body member which also presents a further current communicating face portion situated outwardly of the periphery of said auxiliary plate.

5. In a glass melting furnace of the kind specified, an electrode having a body including a main body member and a support therefor at one side of said main body member, means for cooling said support at a position adjacent its junction with said main body member, said body further including an auxiliary plate connected electrically with said cooling member and mounted in spaced apart relation with said body member on the side thereof remote from said support, material intervening between said auxiliary plate and said body member of thermal conductivity less than that of said body member, said auxiliary plate presenting a current communicating face portion directed away from said main body member, the relative thermal conductivities of said material and said body member and the thickness of said material between said auxiliary plate and said body member being such that in operation said current communicating face portions are maintained at least at approximately equal temperatures.

6. In a glass melting furnace of the kind specified, an electrode having a body including a main body member of plate form and a support therefor at one side of said main body member, said support having a passageway for the passage therethrough of a cooling fluid, said passageway extending to a position adjacent to the junction of said support with said body member, said body further including an auxiliary plate connected electrically with said cooling member and mounted in spaced apart relation with said body member on the side thereof remote from said support, and situated opposite said support, said auxiliary plate presenting a current communicating face portion directed away from said main body member, which also presents a further current communicating face portion situated outwardly of the periphery of said auxiliary plate.

7. An electrode for a glass melting furnace, comprising a body including a main body member of plate form made of an electrically conductive material which is refractory at glass melting temperature, a supporting and current conveying stem secured to said body member projecting from one face thereof and having a passageway for the passage therethrough of a cooling fluid extending to a position immediately adjacent to the junction between said support and said body member, said body further including an auxiliary plate connected electrically with said body member and mounted in spaced apart generally parallel relation with the other face of said body member opposite said support, to establish by virtue of material intervening between said auxiliary plate and said body member in operation of said electrode a thermally resistive barrier between said support and said auxiliary plate.

8. An electrode for a glass melting furnace comprising a body including a main body member of plate form made of an electrically conductive material which is refractory at glass melting temperature, a supporting and current conveying stem made of different material which is stable when exposed to oxygen at its operating temperature, a socket part on one face of said body member, means securing said stem at its end adjacent to said body member in said socket part, a tube in said stem dividing same internally to define inner and outer annular passageways communicating with each other at said end of said stem for circulation of cooling fluid along said stem, said body further including an auxiliary plate connected electrically with said body member and mounted in spaced apart generally parallel relation with the other face of said body member opposite said socket part, said body member extending laterally outwardly of the periphery of said auxiliary plate.

9. An electrode for a glass melting furnace, comprising a body including a main body member of plate form made of an electrically conductive material which is refractory at glass melting temperatures, a supporting and current conveying stem having an outer member made of material which will withstand exposure to atmosphere at its operating temperature and having an internal passageway for the flow therethrough of cooling liquid, a socket part of material refractory at glass melting temperatures and secured to said body member, said stem including an end cap disposed in and lining said socket part so as to be protected thereby against destructive action by molten glass and itself preventing contact between said cooling liquid and said socket part, said socket part being assembled in thermally conductive relation with both said end cap and said body member to permit of relatively intensive cooling of said end cap and the adjacent part of said body member by abstraction of heat therefrom to said cooling liquid, said body further including an auxiliary plate connected electrically with said body member and mounted in spaced apart generally parallel relation with the other face of said body member opposite said socket part, and overlying part only of the face of said body member.

10. An electrode for a glass melting furnace comprising a body including a main body member of plate form made of a metal selected from a group comprising molybdenum and tungsten, a supporting and current conveying stem having an outer member made of a metal which will withstand exposure to the atmosphere at the operating temperature of that part thereof so exposed and having an internal passageway for the flow therethrough of cooling liquid, a socket part made of the same metal and said body member and secured thereto, said outer member of said stem including an end cap disposed in and lining said socket part so as to be protected thereby against destructive action by molten glass and itself preventing contact between said cooling liquid and said socket part, said socket part being assembled in thermally conductive relation with both said end cap and said body member to permit of relatively intensive cooling of said end cap and the adjacent part of said body member by abstraction of heat therefrom to said cooling liquid, said body further including an auxiliary plate connected electrically with said body member and mounted in spaced apart relation with said body member on the side thereof remote from said support and situated opposite said end cap, said auxiliary plate being of a size to overlie that face position of said body member which would otherwise be over-cooled by said intensive cooling of said part of said body member and itself presenting a current communicating face portion directed away from said body member which current communicating face portion is prevented from being overcooled by said spacing of said auxiliary plate from said body member.

11. In an electrode for a glass melting furnace of the kind comprising an electrode body member made from electrically conductive material which is refractory at glass melting temperatures, the provision of a support therefor comprising a stem having an outer member made of material which will withstand exposure to atmosphere at its operating temperature and having an internal passageway for the flow therethrough of cooling liquid, a socket part of material refractory at glass melting temperatures and secured to said body member, said stem including an end cap disposed in and lining said socket part so as to be protected against destructive action by molten glass and itself preventing contact between said cooling liquid and said socket part.

12. In an electrode for a glass melting furnace of the kind comprising an electrode body member made from electrically conductive material which is refractory at glass melting temperatures, the provision of a support therefor comprising a stem having an outer member made of material which will withstand exposure to atmosphere at its operating temperature and having an internal passageway for the flow therethrough of cooling liquid, a conductor member extending axially therethrough, a socket part of material refractory at glass melting temperatures and secured to said body member, said stem including an end cap disposed in and lining said socket part and of material which does not form a corrosion prone junction with the remainder of said outer member in the presence of said cooling liquid, a connection stud made of electrically conductive material which is refractory at glass melting temperatures connected electrically with said body member and with said conductor member and projecting axially within said socket part, said end cap having a sleeve part encasing said connection stud within said outer member of said stem to prevent the setting up of a corrosion prone junction between said stud and said outer member in the interior of the latter exposed to contact with said liquid.

13. In an electrode for a glass melting furnace of the kind comprising an electrode body member made from electrically conductive material which is refractory at glass melting temperatures, the provision of a support therefor comprising a stem having an outer member made of material which will withstand exposure to atmosphere at its operating temperature, a tube in said outer member dividing same internally to define inner and outer annular passageways communicating with each other at that end of said outer member adjacent to said body member for circulation of cooling fluid along said stem, a conductor member extending axially through said tube, a socket part of material refractory at glass melting temperatures and secured to said body member, a connection stud made of electrically conductive material which is refractory at glass melting temperatures connected electrically with said body member and with said conductor member and projecting axially within said socket part, said stem including an end cap having side walls and an end wall fitting closely within said socket part and a sleeve part in said end wall encasing said stud, said end cap affording in its interior an annular cavity between said side walls and said sleeve part, into which annular cavity extends said tube to provide for circulation of said liquid through said end cap and promote heat extraction from said socket part and stud, said end cap lining the assembly comprising said socket part and said stud to prevent the setting up of a corrosion prone junction between said stud and said outer member in the interior of the latter exposed to contact with said liquid.

14. An electrode for a glass melting furnace comprising a main body member of plate form formed of a plurality of plate-elements made of an electrically conductive material which is refractory at glass melting temperatures, a connecting member also made of said material secured to said plate elements in electrically and thermally conductive relation therewith, a support for said body member comprising a stem having an outer member made of material which will withstand exposure to atmosphere at its operating temperature, a tube in said outer member dividing same internally to define inner and outer annular passageways communicating with each other at that end of said outer member adjacent to said body member for circulation of cooling fluid along said stem, a conductor member extending axially through said tube, a socket part of material refractory at glass melting temperatures secured to said connecting member in thermally conductive relation therewith, a connection stud made of electrically conductive material which is refractory at glass melting temperatures, connected electrically with said connection member and with said conductor member and projecting axially within said socket part, said stem including an end cap having side walls and an end wall fitting closely within said socket part and a sleeve part in said end wall encasing said stud, said end cap affording in its interior an annular cavity between said side walls and said sleeve part, into which annular cavity extends said tube to provide for circulation of said liquid through said end cap and promote heat extraction from said socket part and stud, said end cap lining the assembly comprising said socket part and said stud, to prevent the setting up of a corrosion prone junction between said stud and said outer member in the interior of the latter exposed to contact with said liquid.

15. An electrode for a glass melting furnace comprising a main body member made of a metal selected from a group comprising molybdenum and tungsten, a supporting and current conveying stem secured to said body member projecting from one face thereof, said stem having an outer member made of a metal which will withstand exposure to the atmosphere at the operating temperature of that part thereof so exposed, and having an internal passageway for the flow therethrough of cooling liquid, a socket part made of the same metal and said body member and secured thereto, said stem including an end cap of a metal which does not form a corrosion prone junction with the metal of said outer member of the stem in the presence of said cooling liquid, said end cap being disposed in and lining said socket part so as to be protected thereby against destructive action by molten glass and itself preventing contact between said cooling liquid and said socket part.

References Cited in the file of this patent

UNITED STATES PATENTS

| Number | Name | Date |
|---|---|---|
| 961,139 | Keller | June 14, 1910 |
| 1,542,716 | Payne | June 6, 1929 |
| 1,880,540 | Wadman | Oct. 4, 1932 |
| 2,209,515 | Ehman et al. | July 30, 1940 |
| 2,594,972 | Muehlenkamp | Apr. 29, 1952 |
| 2,594,973 | Muehlenkamp | Apr. 29, 1952 |